United States Patent
Kwon et al.

(10) Patent No.: US 9,680,155 B2
(45) Date of Patent: Jun. 13, 2017

(54) CABLE-TYPE SECONDARY BATTERY

(71) Applicant: LG Chem, Ltd., Seoul (KR)

(72) Inventors: Yo-Han Kwon, Daejeon (KR); Sang-Wook Woo, Daejeon (KR); Hye-Ran Jung, Busan (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 161 days.

(21) Appl. No.: 13/937,517

(22) Filed: Jul. 9, 2013

(65) Prior Publication Data

US 2013/0295425 A1 Nov. 7, 2013

Related U.S. Application Data

(63) Continuation of application No. PCT/KR2012/009205, filed on Nov. 2, 2012.

(30) Foreign Application Priority Data

Nov. 2, 2011 (KR) .................. 10-2011-0113516
Nov. 2, 2011 (KR) .................. 10-2011-0113517
Nov. 1, 2012 (KR) .................. 10-2012-0123118

(51) Int. Cl.
*H01M 2/02* (2006.01)
*H01M 4/70* (2006.01)
(Continued)

(52) U.S. Cl.
CPC ............ *H01M 4/70* (2013.01); *H01M 2/204* (2013.01); *H01M 2/30* (2013.01); *H01M 4/66* (2013.01);
(Continued)

(58) Field of Classification Search
CPC .......... H01M 4/70; H01M 2/30; H01M 10/04; H01M 4/78; H01M 10/0587;
(Continued)

(56) References Cited

U.S. PATENT DOCUMENTS 5,750,286 A 5/1998 Paulot et al.
5,795,680 A * 8/1998 Ikeda et al. .................. 429/245
(Continued)

FOREIGN PATENT DOCUMENTS

CN 1328349 A 12/2001
EP 0331342 A2 9/1989
(Continued)

OTHER PUBLICATIONS

Machine translation of JP 63-121265, retrieved from <http://search.proquest.com/professional/japanpatentsft/patents/fromBasicHomePage?accountid=161361> on Mar. 24, 2015.*
(Continued)

*Primary Examiner* — Cynthia K Walls
(74) *Attorney, Agent, or Firm* — Lerner, David, Littenberg, Krumholz & Mentlik, LLP

(57) ABSTRACT

The present invention relates to a cable-type secondary battery having a horizontal cross section of a predetermined shape and extending longitudinally, comprising: an inner electrode comprising a wire-type inner current collector having a first metal tab formed to be extended in a predetermined length at one end thereof, and an inner electrode active material layer formed on the surface of the inner current collector; a separator layer formed on the outer surface of the inner electrode active material layer; and an outer electrode formed on the outer surface of the separator layer, and comprising an outer electrode active material layer and an outer current collector having a second metal tab formed to be extended in a predetermined length at one end thereof.

24 Claims, 2 Drawing Sheets

(51) Int. Cl.
| | |
|---|---|
| *H01M 2/20* | (2006.01) |
| *H01M 4/66* | (2006.01) |
| *H01M 10/04* | (2006.01) |
| *H01M 10/0525* | (2010.01) |
| *H01M 10/0587* | (2010.01) |
| *H01M 2/30* | (2006.01) |
| *H01M 4/78* | (2006.01) |
| *H01M 2/16* | (2006.01) |
| *H01M 10/0565* | (2010.01) |
| *H01M 10/0568* | (2010.01) |

(52) U.S. Cl.
CPC ............ *H01M 4/78* (2013.01); *H01M 10/04* (2013.01); *H01M 10/0422* (2013.01); *H01M 10/0525* (2013.01); *H01M 10/0587* (2013.01); H01M 2/166 (2013.01); H01M 2/1653 (2013.01); *H01M 10/0565* (2013.01); *H01M 10/0568* (2013.01); Y02E 60/122 (2013.01); Y02P 70/54 (2015.11); Y02T 10/7011 (2013.01)

(58) Field of Classification Search
CPC ............ H01M 10/0525; H01M 2/204; H01M 10/0422; H01M 4/66; H01M 2/166; H01M 2/1653; H01M 10/0568; H01M 10/0565; Y02E 60/122
See application file for complete search history.

(56) References Cited

U.S. PATENT DOCUMENTS

| | | | | |
|---|---|---|---|---|
| 6,054,233 | A * | 4/2000 | Vourlis | 429/61 |
| 6,165,645 | A * | 12/2000 | Nishimura et al. | 429/303 |
| 6,503,661 | B1 * | 1/2003 | Park | H01M 10/0525 252/62.2 |
| 2001/0038938 | A1 | 11/2001 | Takahashi et al. | |
| 2004/0062958 | A1 | 4/2004 | Facchi et al. | |
| 2006/0215106 | A1 | 9/2006 | Kang et al. | |
| 2007/0037058 | A1 * | 2/2007 | Visco et al. | 429/246 |
| 2007/0243456 | A1 | 10/2007 | Ahn et al. | |
| 2008/0050657 | A1 * | 2/2008 | Nishida et al. | 429/306 |
| 2009/0035657 | A1 * | 2/2009 | Buiel | H01G 11/46 429/211 |
| 2009/0130511 | A1 | 5/2009 | Eshraghi et al. | |
| 2010/0203372 | A1 * | 8/2010 | Kim et al. | 429/94 |
| 2010/0285356 | A1 | 11/2010 | Choi et al. | |
| 2011/0262809 | A1 | 10/2011 | Kumagai et al. | |
| 2012/0009331 | A1 | 1/2012 | Kwon et al. | |
| 2012/0015233 | A1 | 1/2012 | Kwon et al. | |
| 2012/0058376 | A1 | 3/2012 | Kwon et al. | |
| 2014/0030569 | A1 | 1/2014 | Kwon et al. | |

FOREIGN PATENT DOCUMENTS

| | | | | |
|---|---|---|---|---|
| EP | 0454419 | A2 | 10/1991 | |
| EP | 0532312 | A1 | 3/1993 | |
| EP | 2367228 | A1 | 9/2011 | |
| JP | 63-121265 | * | 5/1988 | ............. H01M 4/68 |
| JP | 09-007629 | A | 1/1997 | |
| JP | 2001-110445 | A | 4/2001 | |
| JP | 2005011556 | A | 1/2005 | |
| JP | 2008-537601 | A | 9/2008 | |
| JP | 2010218986 | A | 9/2010 | |
| KR | 2003-0081499 | | 10/2003 | |
| KR | 20050099903 | A | 10/2005 | |
| KR | 0742739 | | 7/2007 | |
| KR | 0804411 | | 2/2008 | |
| KR | 20090009598 | A | 1/2009 | |
| KR | 2010-0098227 | A | 9/2010 | |
| KR | 2010-0121387 | A | 11/2010 | |
| KR | 20110054557 | A | 5/2011 | |
| KR | 2011-0087880 | A | 8/2011 | |
| KR | 20110090768 | A | 8/2011 | |
| WO | WO 2005/098994 | * | 10/2005 | ............. H01M 2/10 |
| WO | 2006/077192 | A1 | 7/2006 | |
| WO | 2010052950 | A1 | 5/2010 | |
| WO | 2011093661 | A2 | 8/2011 | |
| WO | 2012124960 | A2 | 9/2012 | |

OTHER PUBLICATIONS

Mesh. (2011). In the Editors of the American Heritage Dictionaries & TheEditorsoftheAmericanHeritageDictionaries (Eds.), The American Heritage Dictionary of the English language. Boston, MA: Houghton Mifflin. Retrieved from http://search.credoreference.com/content/entry/hmdictenglang/mesh/0, retrieved on May 7, 2016.*
International Search Report for Application No. PCT/KR2012/009205 dated Mar. 28, 2013.
Supplemental search report for European Application No. EP 12 84 6759, dated Feb. 27, 2015.
Jong-Hee Kim et al., "Degradation of cathode current-collecting materials for anode-supported flat-tube solid oxide fuel cell." Journal of Power Sources, vol. 188 (2009), No. 2, pp. 447-452, Available online on Dec. 24, 2008.
International Search Report for Application No. PCT/KR2012/008402 dated Feb. 28, 2013.
Machine translation of JP 2008-047398, retrieved from <https://www.j-platpat.inpit.go.jp/web/all/top/BTmTopEnglishPage> on May 22, 2015.
Supplemental Search Report from European Appln. No. 12 84 0550, dated Mar. 27, 2015.

* cited by examiner

CABLE-TYPE SECONDARY BATTERY

CROSS-REFERENCE TO RELATED APPLICATION

This application is a continuation of International Application No. PCT/KR2012/009205 filed on Nov. 2, 2012, which claims priority under 35 USC 119(a) to Korean Patent Application Nos. 10-2011-0113516 and 10-2011-0113517 filed in the Republic of Korea on Nov. 2, 2011 and Korean Patent Application No. 10-2012-0123118 filed in the Republic of Korea on Nov. 1, 2012, the disclosures thereof are incorporated herein by reference.

TECHNICAL FIELD

The present invention relates to a cable-type secondary battery, which can freely change in shape, and more particularly to a cable-type secondary battery comprising a current collector having a metal tab formed at one end thereof.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery consisting of a plurality of cathodes and anodes and separators interposed between each cathode and each anode. Korean Patent No. 0742739 discloses a thread-type flexible battery consisting of cathode threads and anode threads.

These cable type secondary batteries are configured to be thin and long so that they are capable of being flexible in the longitudinal direction. However, in the case that such a cable-type secondary battery having a relatively long linear structure and good flexibility is used in a device, the electrodes of the device may be deformed by excessive physical force. Accordingly, the cable-type secondary battery requires an electrode having a durable structure, unlike conventional electrodes.

DISCLOSURE

Technical Problem

The present invention is designed to solve the problems of the prior art, and therefore it is an object of the present invention to provide a secondary battery comprising a current collector having a metal tab formed at one end thereof.

Technical Solution

In order to achieve the objects, the present invention provides a cable-type secondary battery having a horizontal cross section of a predetermined shape and extending longitudinally, comprising: an inner electrode comprising a wire-type inner current collector having a first metal tab formed to be extended in a predetermined length at one end thereof, and an inner electrode active material layer formed on the surface of the inner current collector; a separator layer formed on the outer surface of the inner electrode active material layer; and an outer electrode formed on the outer surface of the separator layer, and comprising an outer electrode active material layer and an outer current collector having a second metal tab formed to be extended in a predetermined length at one end thereof.

Also, the cable-type secondary battery may further comprise a first electrolyte-leakage preventing layer formed on the outer surface of the first metal tab; a second electrolyte-leakage preventing layer formed on the outer surface of the second metal tab; and a protection coating closely surrounding the outer current collector and comprising a heat shrinkable tube.

The first metal tab and the second metal tab may be each independently made of stainless steel, aluminum, nickel, titanium, sintered carbon, or copper; stainless steel treated with carbon, nickel, titanium or silver on the surface thereof; or an aluminum-cadmium alloy.

The first electrolyte-leakage preventing layer and the second electrolyte-leakage preventing layer may each independently comprise a thermal adhesive film or a heat shrinkable tube, and the thermal adhesive film may comprise polyethylene, polypropylene, polyethylene terephthalate, polyamide or polyimide.

In the outer electrode, the outer electrode active material layer may be formed to surround the outer surface of the separation layer, and the outer current collector may be formed to surround the outer surface of the outer electrode active material layer; the outer current collector may be formed to surround the outer surface of the separation layer, and the outer electrode active material layer may be formed to surround the outer surface of the outer current collector; the outer current collector may be formed to surround the outer surface of the separation layer, and the outer electrode active material layer may be formed to surround the outer surface of the outer current collector and to come into contact with the separation layer; or the outer electrode active material layer may be formed to surround the outer surface of the separation layer, and the outer current collector may be formed to be included inside the outer electrode active material layer by being covered therein and to surround the outer surface of the separation layer with spacing apart therefrom.

In the present invention, the outer current collector may be in the form of a pipe, a wound wire, a wound sheet or a mesh, preferably a wound wire-formed current collector.

The outer current collector may be made of, but is not particularly limited to stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. The conductive material may be selected from the group consisting of polyacetylene, polyaniline, polypyrrole, polythiophene, polysulfumitride, indium tin oxide (ITO), silver, palladium, nickel, and a mixture thereof, but is not particularly limited thereto. Also, the conductive polymer may be selected from the group consisting of polyacetylene, polyaniline, polypyrrole, polythiophene, polysulfurnitride, and a mixture thereof, but is not particularly limited thereto.

Further, the outer current collector may comprise a conductive paste. The conductive paste may be a metal paste or a carbon paste, but is not particularly limited thereto.

The metal paste may comprise metal powders selected from Ni, Al, Au, Ag, Al, Pd/Ag, Cr, Ta, Cu, Ba, ITO and a mixture thereof, and a binder, and the carbon paste may comprise carbon powders selected from graphite, carbon black, carbon nanotube and a mixture thereof, and a binder. The binder may be selected from an acryl-based resin, a vinyl-based resin, hydroxycellulose, methyl cellulose, nitrocellulose, ethylene cellulose, a modified resin of said resins, and a mixture thereof, but is not particularly limited thereto.

The inner current collector of the present invention may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer, but is not particularly limited thereto. The conductive material may be selected from the group consisting of polyacetylene, polyaniline, polypyrrole, polythiophene, polysulfurnitride, indium tin oxide (ITO), silver, palladium, nickel, and a mixture thereof, but is not particularly limited thereto. The conductive polymer may be selected from the group consisting of polyacetylene, polyaniline, polypyrrole, polythiophene, polysulfurnitride, and a mixture thereof, but is not particularly limited thereto.

In the present invention, the inner electrode is an anode and the outer electrode is a cathode, or the inner electrode is a cathode and the outer electrode is an anode. The inner and outer electrodes may have an anode active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and a mixture thereof; or a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The separation layer of the present invention may be an electrolyte layer or a separator. The electrolyte layer comprises, but is not particularly limited to, an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte layer may further comprise a lithium salt, and non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

When the separation layer is a separator, the separator may be, but is not particularly limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Advantageous Effects

In the cable-type secondary battery of the present invention, a metal tab made of a substance having superior strength is used in one end of a current collector having relatively weak strength to provide good mechanical strength to the current collector. Also, such a metal tab can be used to prepare various electrode terminals. In addition, when the metal tab comprises an electrolyte-leakage preventing layer, an electrolyte comprised in the cable-type secondary battery can be prevented from being leaked to the outside.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention provides a cable-type secondary battery having a horizontal cross section of a predetermined shape and extending longitudinally, comprising: an inner electrode comprising a wire-type inner current collector having a first metal tab formed to be extended in a predetermined length at one end thereof, and an inner electrode active material layer formed on the surface of the inner current collector; a separator layer formed on the outer surface of the inner electrode active material layer; and an outer electrode formed on the outer surface of the separator layer, and comprising an outer electrode active material layer and an outer current collector having a second metal tab formed to be extended in a predetermined length at one end thereof.

The term 'a predetermined shape' used herein refers to not being particularly limited to any shape, and means that any shape that does not damage the nature of the present invention is possible. Also, the term 'a predetermined length' used herein refers to not being particularly limited to any length, and means that any length that does not damage the nature of the present invention is possible. The cable-type secondary battery of the present invention has a horizontal cross section of a predetermined shape, a linear structure, which extends in the longitudinal direction to the horizontal cross section, and flexibility, so it can freely change in shape.

Hereinafter, the cable-type secondary battery having a metal tab according to the present invention will be described with reference to the drawings.

Figure 1:
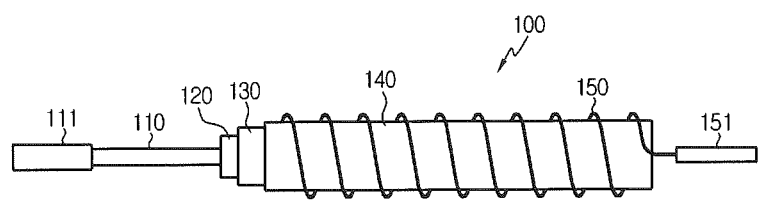
FIG. 1 is a cross-sectional view of a cable-type secondary battery comprising a wound outer current collector having a metal tab.
Figure 2:
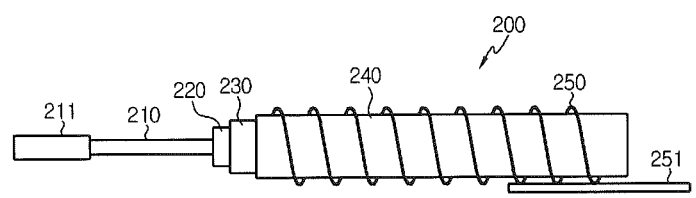
FIG. 2 is a cross-sectional view of a cable-type secondary battery comprising a wound outer current collector having a metal tab.

Each of FIGS. 1 and 2 schematically shows a cable-type secondary battery comprising a wound outer current collector having a metal tab in accordance with a preferred embodiment of the present invention. However, the configurations illustrated in the drawings and the embodiments of this disclosure are just preferable examples for the purpose of illustrations only, not intended to limit the scope of the present invention, so it should be understood that other equivalents and modifications could be made thereto without departing from the spirit and scope of the present invention.

Referring to FIG. 1, a cable-type secondary battery 100 according to one embodiment of the present invention has a horizontal cross section of a predetermined shape and extending longitudinally, and comprises a wire-type inner current collector 110 having a first metal tab 111 formed to be extended in a predetermined length at one end thereof; an inner electrode active material layer 120 formed on the surface of the inner current collector 110; a separator layer 130 formed on the outer surface of the inner electrode active material layer 120; an outer electrode active material layer 140 formed on the outer surface of the separator layer 130; and an outer current collector 150 formed on the outer surface of the outer electrode active material layer 140 and having a second metal tab 151 formed to be extended in a predetermined length at one end thereof.

In the present invention, the first metal tab 111 is formed to be extended in a predetermined length at one end of the wire-type inner current collector 110, and acts as a path through which electrons move to the inside or outside of the battery. It is difficult for the inner current collector 110 formed in a wire to have high mechanical strength and may be deformed by its repetitive use. In particular, since much stress is focused on a part of the inner current collector in contact with external devices, the chances of the contact part to deform is relatively high. Such a deformation probability can be solved by providing the first metal tab 111 made of a metal material having good mechanical property in the inner current collector, as performed in the present invention.

Also, in the present invention, the second metal tab 151 is formed to be extended in a predetermined length at one end of the outer current collector 150. The outer current collector 150, similar to the inner current collector 110, may also be deformed by its repetitive use, especially, in a part thereof in contact with external devices. Therefore, the outer current collector 150 of the present invention comprises the second metal tab 151 made of a metal material having good mechanical property, thereby solving the deformation probability.

The first metal tab 111 and the second metal tab 151 can be easily processed to be effectively used in the preparation of various electrode terminals for connecting with external devices.

The first metal tab 111 and the second metal tab 151 are preferably made of a metal material having good mechanical property, for example, stainless steel, aluminum, nickel, titanium, sintered carbon, or copper; stainless steel treated with carbon, nickel, titanium or silver on the surface thereof; or an aluminum-cadmium alloy, but is not particularly limited thereto.

The first metal tab 111 and the second metal tab 151 may be formed in the cross-section of each end of the inner current collector 110 and the outer current collector 150, respectively, by means of welding.

Also, referring to FIG. 2, a second metal tab 251 is not formed in the cross-section of one end of the outer current collector 250, but formed so that a considerable portion thereof is in direct contact with the outer surface of an outer current collector 250. The formation of the second metal tab may be carried out by welding or by packaging with a heat-shrinkage tube to surround both the outer current collector 250 and the second metal tab 251.

In FIG. 2, the outer current collector 250 of the present invention is in the form of a wound wire. Such a wound wire-type outer current collector 250 has elasticity together with good flexibility, thereby improving the overall flexibility of the cable-type secondary battery.

Figure 3:
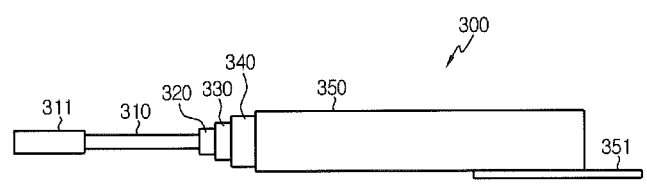
FIG. 3 is a cross-sectional view of a cable-type secondary battery comprising an outer current collector formed with a conductive paste and having a metal tab.

In addition, referring to FIG. 3, an outer current collector 350 comprising a conductive paste may be used in the present invention.

Hereinafter, the cable-type secondary battery further comprising a leakage preventing layer and a protection coating of a heat-shrinkable tube, as well as the metal tab, will be described with reference to the drawings.

The cable-type secondary battery of the present invention may further comprise a first electrolyte-leakage preventing layer formed on the outer surface of the first metal tab; a second electrolyte-leakage preventing layer formed on the outer surface of the second metal tab; and a protection coating closely surrounding the outer current collector and comprising a heat shrinkable tube.

Figure 4:
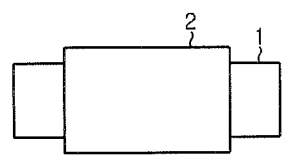
FIG. 4 is a cross-sectional view of a metal tab having an electrolyte-leakage preventing layer formed thereon.
Figure 5:
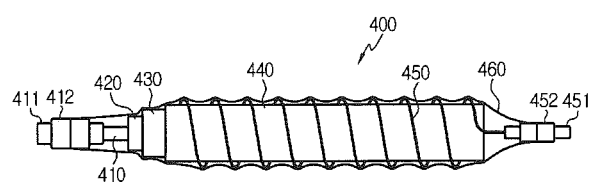
FIG. 5 is a cross-sectional view of a cable-type secondary battery comprising a wound outer current collector having a metal tab provided with an electrolyte-leakage preventing layer, and a protection coating made of a heat-shrinkable tube.
Figure 6:
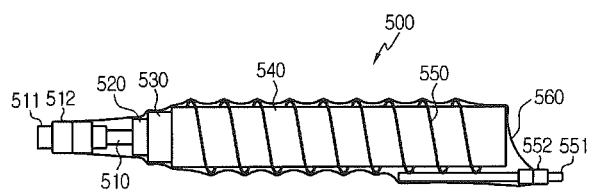
FIG. 6 is a cross-sectional view of a cable-type secondary battery comprising a wound outer current collector having a metal tab provided with an electrolyte-leakage preventing layer, and a protection coating made of a heat-shrinkable tube.

FIG. 4 shows a cross-section of a metal tab having an electrolyte-leakage preventing layer formed thereon, and each of FIGS. 5 and 6 schematically shows a cable-type secondary battery comprising a wound outer current collector having a metal tab provided with an electrolyte-leakage preventing layer, and a protection coating made of a heat-shrinkable tube in accordance with one embodiment of the present invention. However, the configurations illustrated in the drawings and the embodiments of this disclosure are just preferable examples for the purpose of illustrations only, not intended to limit the scope of the present invention, so it should be understood that other equivalents and modifications could be made thereto without departing from the spirit and scope of the present invention.

Referring to FIG. 5, a cable-type secondary battery 400 according to one embodiment of the present invention has a horizontal cross section of a predetermined shape and extending longitudinally, and comprises a wire-type inner current collector 410 having a first metal tab 411 formed to be extended in a predetermined length at one end thereof and a first electrolyte-leakage preventing layer 412 formed on the outer surface of the first metal tab 411; an inner electrode active material layer 420 formed on the surface of the inner current collector 410; a separator layer 430 formed on the outer surface of the inner electrode active material layer 420; an outer electrode active material layer 440 formed on the outer surface of the separator layer 430; an outer current collector 450 formed on the outer surface of the outer electrode active material layer 440 and having a second metal tab 451 formed to be extended in a predetermined length at one end thereof and a second electrolyte-leakage preventing layer 452 formed on the outer surface of the second metal tab 451; and a protection coating 460 closely surrounding the outer current collector and comprising a heat shrinkable tube.

Generally, since an electrolyte which is essentially used in secondary batteries is a liquid or a fluidic gel form, it may be leaked. In particular, since the cable-type secondary battery of the present invention having a linear structure uses a wire- or a pipe-type current collector, it is not easy to form a protection coating for preventing the leakage of the electrolyte. Referring to FIG. 4, in the present invention, a metal tab 1 to be connected to a current collector has an electrolyte-leakage preventing layer 2 on the surface thereof, to allow firm binding with an external coating comprising a heat-shrinkable tube and prevent the electrolyte from being leaked. The electrolyte-leakage preventing layer 2 may be made of a thermal adhesive film or a heat shrinkable tube, and thus, the electrolyte-leakage preventing layer 2 can improve the adhesiveness of the metal tab 1 and the external coating to prevent the leakage of the electrolyte. Also, since the use of the metal tab 1 having the electrolyte-leakage preventing layer 2 on the surface thereof increases the diameter of the current collector indirectly, the binding of the metal tab 1 with the external coating can be enhanced by the heat shrinkage of the external coating comprising a heat-shrinkable tube.

The thermal adhesive film may be made of polyethylene, polypropylene, polyethylene terephthalate, polyamide or polyimide, but is not particularly limited thereto.

Also, referring to FIG. 6, a second metal tab 551 is not formed in the cross-section of one end of the outer current collector 550, but may be formed so that a considerable portion thereof is in direct contact with the outer surface of an outer current collector 550. The formation of the second metal tab may be carried out by welding or by packaging with a heat-shrinkage tube to surround both the outer current collector 550 and the second metal tab 551.

In FIG. 6, the outer current collector 550 of the present invention is in the form of a wound wire. Such a wound wire-type outer current collector 550 has elasticity together with good flexibility, thereby improving the flexibility of the whole cable-type secondary battery.

Figure 7:
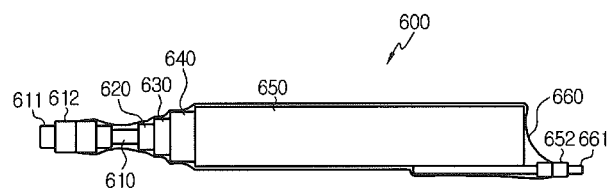
FIG. 7 is a cross-sectional view of a cable-type secondary battery comprising an outer current collector formed with a conductive paste, and having a metal tab provided with an electrolyte-leakage preventing layer and a protection coating made of a heat-shrinkable tube.

In addition, referring to FIG. 7, an outer current collector 650 comprising a conductive paste may be used in the present invention.

The first metal tab and the second metal tab may be each independently made of stainless steel, aluminum, nickel, titanium, sintered carbon, or copper; stainless steel treated with carbon, nickel, titanium or silver on the surface thereof; or an aluminum-cadmium alloy.

The first electrolyte-leakage preventing layer and the second electrolyte-leakage preventing layer may each independently comprise a thermal adhesive film or a heat shrinkable tube, and the thermal adhesive film may comprise polyethylene, polypropylene, polyethylene terephthalate, polyamide or polyimide.

In the present invention, the outer electrode may be formed in a structure having the outer electrode active material layer formed to surround the outer surface of the separation layer, and the outer current collector formed to surround the outer surface of the outer electrode active material layer; a structure having the outer current collector formed to surround the outer surface of the separation layer, and the outer electrode active material layer formed to surround the outer surface of the outer current collector; a structure having the outer current collector formed to surround the outer surface of the separation layer, and the outer electrode active material layer formed to surround the outer surface of the outer current collector and to come into contact with the separation layer; or a structure having the outer electrode active material layer formed to surround the outer surface of the separation layer, and the outer current collector formed to be included inside the outer electrode active material layer by being covered therein and to surround the outer surface of the separation layer with spacing apart therefrom.

In the present invention, the outer current collector may be in the form of a pipe, a wound wire, a wound sheet or a mesh, preferably a wound wire-formed current collector.

Specifically, if the outer current collector is wound on the outer surface of the separation layer, a contact area of the separation layer and the active material layer sufficiently increases to ensure a certain degree of battery performances. Particularly, since the outer electrode active material layer of the present invention is formed by coating an active material in the form of a slurry on the outer surface of the outer current collector, the outer electrode active material layer comes into contact with the separation layer. Also, the outer current collector is included inside the outer electrode active material layer by being covered therein, while surrounding the outer surface of the separation layer with spacing apart therefrom by the outer electrode active material layer. As a result, an electric contact between the outer current collector and the outer electrode active material layer is improved, thereby contributing to the enhancement of battery characteristics.

For example, when the outer current collector is in the form of a wound wire having flexibility, the wound wire-form outer current collector has elasticity due to its form to enhance the overall flexibility of the cable-type secondary battery. Also, when excessive external force is applied to the cable-type secondary battery of the present invention, the wire-form outer current collector of the present invention undergoes very little excessive deformation such as crumpling or bending, so a short circuit due to a contact with an inner current collector may be avoided.

The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer, but is not particularly limited thereto. The conductive material may include polyacetylene, polyaniline, polypyrrole, polythiophene, polysulfurnitride, indium tin oxide (ITO), copper, silver, palladium and nickel, but is not particularly limited thereto. The conductive polymer may include polyacetylene, polyaniline, polypyrrole, polythiophene and polysulfurnitride, but is not particularly limited thereto.

As shown in FIGS. 3 and 7, the outer current collector may comprise a conductive paste. The conductive paste refers to a paste capable of forming a general coating layer and is used when electric current flows in a dried substrate. Such a conductive paste is obtained by dispersing the powders of a conductive material in a binder. When the current collector is formed with such a conductive paste, the current collector has good flexibility, thereby improving the flexibility of a cable-type secondary battery using the same. Also, the current collector formed with such a conductive paste has a relatively higher flexibility than a current collector made of a metal such as copper or aluminum, to reduce the weight of a cable-type secondary battery. In addition, since the current collector formed with such a conductive paste has good flexibility, even though an excessive external force is applied to the cable-type secondary battery of the present invention, little to no excessive deformation such as bending or severe folding occurs, and a short circuit due to the contact with the inner current collector can be minimized. Also, the conductive paste is applied on the outer surface of the outer electrode active material layer, according to its physical property, to form the outer current collector, and such an outer current collector exhibits good contact characteristic with the outer electrode active material layer, thereby effectively preventing the release of an electrode active material, which may occur from battery deformation by external force.

The conductive paste may be a metal paste or a carbon paste. The metal paste preferably comprises metal powders selected from Ni, Al, Au, Ag, Al, Pd/Ag, Cr, Ta, Cu, Ba, ITO and a mixture thereof, and a binder. Examples of the binder which may be used in the present invention include an acryl-based resin, a vinyl-based resin, hydroxycellulose, methyl cellulose, nitrocellulose, ethylene cellulose, and a modified resin thereof, but is not particularly limited thereto. Meanwhile, the carbon paste preferably comprises carbon powders selected from graphite, carbon black, carbon nanotube and a mixture thereof, and a binder. Optionally, the carbon paste may further comprise a conductive material. Examples of the binder which may be used in the present invention include an acryl-based resin, a vinyl-based resin, hydroxycellulose, methyl cellulose, nitrocellulose, ethylene cellulose, and a modified resin thereof, but is not particularly limited thereto.

The inner current collector of the present invention is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The inner current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material used in the present invention may be selected from the group consisting of polyacetylene, polyaniline, polypyrrole, polythiophene, polysulfurnitride, indium tin oxide (ITO), silver, palladium, nickel, and a mixture thereof, but is not particularly limited thereto. The conductive polymer may be selected from the group consisting of polyacetylene, polyaniline, polypyrrole, polythiophene, polysulfurnitride, and a mixture thereof. Meanwhile, a non-conductive polymer used in the current collector is not particularly limited to its kinds.

In the present invention, the inner electrode may be an anode and the outer electrode may be a cathode. Alternatively, the inner electrode may be a cathode and the outer electrode may be an anode.

The electrode active material layer of the present invention allows ions to move through the current collector, and the movement of ions is caused by the interaction of ions such as intercalation/deintercalation of ions into and from the electrolyte layer. Such an electrode active material layer may be divided into an anode active material layer and a cathode active material layer. Such an electrode active material layer may be formed by using an anode active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and a mixture thereof, or a cathode active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

The separation layer of the present invention may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone.

In the case of the typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve the poor mechanical properties. The electrolyte layer of the present invention can serve as a separator, and thus an additional separator may be omitted.

The electrolyte layer of the present invention may further comprise a lithium salt. The lithium salt can improve ionic conductivity and response time. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

When the separation layer is a separator, the cable-type secondary battery of the present invention requires an electrolyte solution. Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Among these, in order for the lithium ions of the core for supplying lithium ions to be transferred to the outer electrode, it is preferred to use a non-woven fabric separator corresponding to the porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

Also, the cable-type secondary battery of the present invention has a protection coating on the outer surface of the outer current collector. The protection coating is an insulator and is formed to surround the outer current collector, thereby protecting the electrodes against moisture in the air and external impacts. The protection coating may be made of conventional polymer resins, for example, PVC, HDPE or epoxy resins. In addition, in the present invention, a heat-shrinkable tube may be used as the protection coating. The heat-shrinkable tube is shrunk when heated to closely encase a terminal or a substance having other shapes or sizes. Such a heat-shrinkable tube is mostly made of a polymer resin and used for insulating or other purposes. In the present invention, commercially available heat-shrinkable tubes made of various materials and having various forms may be properly used according to the desired purpose. Generally, since the heat-shrinkable tube is inserted in lithium ion batteries by using an automatic coating machine before heat shrinkage, hardness so that its opening can be opened and supported by itself is required. Also, a shrinkage process is preferably carried out at a low temperature, for example, at a temperature of 120° C. or less, so as to avoid the thermal damage of the lithium ion batteries.

In the present invention, a heat-shrinkable tube as a protection coating is inserted in the electrode assembly and shrunk by heating to be closely formed on the outer surface of the outer current collector in the preparation of the cable-type secondary battery. Such formation of the protection coating by the use of the heat-shrinkable tube needs no post-processing such as a drying procedure, and thus, can achieve the simplification of a preparation method, as well as a successive process. Also, the formation of the protection coating by a simple insertion allows the easy preparation of batteries.

Hereinafter, a cable-type secondary battery according to one embodiment of the present invention and the manufacture thereof will be briefly explained with reference to FIG. 1.

The cable-type secondary battery 100 according to one embodiment of the present invention has a horizontal cross section of a predetermined shape and extending longitudinally, and comprises a wire-type inner current collector 110 having a first metal tab 111 formed to be extended in a predetermined length at one end thereof; an inner electrode active material layer 120 formed on the surface of the inner current collector 110; a separator layer 130 formed on the outer surface of the inner electrode active material layer 120; an outer electrode active material layer 140 formed on the outer surface of the separator layer 130; and an outer current collector 150 formed on the outer surface of the outer electrode active material layer 140 and having a second metal tab 151 formed to be extended in a predetermined length at one end thereof.

First, the linear wire-type inner current collector 110 for an anode is provided, and the inner electrode (anode) active material layer 120 is formed by way of coating on the surface of the inner current collector 110. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

Subsequently, the separation layer 130 as an electrolyte layer is formed to surround the inner electrode (anode) 120. The formation of the separation layer 130 as an electrolyte layer is preferably carried out by way of extrusion-coating considering the characteristics of the linear cable-type secondary battery, but is not particularly limited thereto.

On the outer surface of the separation layer 130 formed by the coating of an electrolyte, the outer electrode active material layer 140 for a cathode is formed by way of coating. The coating method of the inner electrode (anode) active material layer may be identically applied to the outer electrode (cathode) active material layer 140.

Then, the outer current collector 150 in the form of a wire is provided and wound on the outer surface of the outer electrode active material layer 140 to form the wound wire-type outer current collector, thereby preparing an electrode assembly.

After that, the first metal tab 111 is welded at one end of the inner current collector 110, and the second metal tab 151 is welded at one end of the outer current collector 150.

Finally, a protection coating is formed to surround the outer surface of the electrode assembly. The protection coating is an insulator and is formed on the outermost surface for the purpose of protecting the electrodes against moisture in the air and external impacts. As the protection coating 160, conventional polymer resins, for example, PVC, HDPE and epoxy resins may be used.

Further, such a cable-type secondary battery has the inner electrode consisting of multiple inner current collectors coated with an electrode active material, thereby allowing to control the balance between a cathode and anode and prevent a short circuit.

Hereinafter, another embodiment of the present invention will be briefly explained with reference to FIG. 3. The cable-type secondary battery shown in FIG. 3 is prepared by repeating the preparation method of FIG. 1, except that a cathode current collector 350 as an outer current collector is obtained by applying a silver paste on the outer surface of a cathode active material layer 340.

Hereinafter, in accordance with one embodiment of the present invention, a cable-type secondary battery comprising a metal tab, a leakage preventing layer and a heat-shrinkable tube, and the manufacture thereof will be briefly explained with reference to FIG. 5.

A cable-type secondary battery 400 according to one embodiment of the present invention has a horizontal cross section of a predetermined shape and extending longitudinally, and comprises a wire-type inner current collector 410 having a first metal tab 411 formed to be extended in a predetermined length at one end thereof and a first electrolyte-leakage preventing layer 412 formed on the outer surface of the first metal tab 411; an inner electrode active material layer 420 formed on the surface of the inner current collector 410; a separator layer 430 formed on the outer surface of the inner electrode active material layer 420; an outer electrode active material layer 440 formed on the outer surface of the separator layer 430; an outer current collector 450 formed on the outer surface of the outer electrode active material layer 440, and having a second metal tab 451 formed to be extended in a predetermined length at one end thereof and a second electrolyte-leakage preventing layer 452 formed on the outer surface of the second metal tab 451; a protection coating 460 closely surrounding the outer current collector 450 and comprising a heat-shrinkable tube.

In this case, after the preparation of an electrode assembly, the first metal tab 411 provided with the first electrolyte-leakage preventing layer 412 is welded at one end of the inner current collector 410 for an anode, and the second metal tab 451 provided with the second electrolyte-leakage preventing layer 452 is welded at one end of the outer current collector 450 for a cathode, and finally the protection coating 460 is formed to surround the outer surface of the electrode assembly, specifically by inserting the electrode assembly in a heat-shrinkable tube made of PET, followed by heating. The other procedures are the same as FIG. 1.

FIG. 6 shows a cable-type secondary battery according to another embodiment of the present invention, wherein a cathode current collector 550 as an outer current collector is obtained by applying a silver paste on the outer surface of a cathode active material layer 540 during preparing an electrode assembly, and the other components are prepared by the same procedures as FIG. 5.

EXPLANATION OF REFERENCE NUMERALS 100, 200, 300, 400, 500, 600: Cable-type Secondary Battery
110, 210, 310, 410, 510, 610: Inner Current Collector
111, 211, 311, 411, 511, 611: First Metal Tab
120, 220, 320, 420, 520, 620: Inner Electrode Active Material Layer
130, 230, 330, 430, 530, 630: Separation Layer
140, 240, 340, 440, 540, 640: Outer Electrode Active Material Layer
150, 250, 350, 450, 550, 650: Outer Current Collector
151, 251, 351, 451, 551, 651: Second Metal Tab

What is claimed is:

1. A cable-type secondary battery extending longitudinally, comprising:
    an inner electrode comprising a wire-type inner current collector having a first metal tab extending at one end of the inner current collector, and an inner electrode active material layer formed on a surface of the inner current collector;
    a separation layer formed on an outer surface of the inner electrode active material layer; and
    an outer electrode formed on an outer surface of the separation layer, and comprising an outer electrode active material layer and an outer current collector having a second metal tab extending at one end of the outer current collector,
    wherein the outer current collector is a helically wound wire-type current collector or a helically wound sheet-type current collector.

2. The cable-type secondary battery according to claim 1, which further comprises
    a first electrolyte-leakage preventing layer formed on an outer surface of the first metal tab;
    a second electrolyte-leakage preventing layer formed on an outer surface of the second metal tab; and
    a protection coating closely surrounding the outer current collector and comprising a heat shrinkable tube.

3. The cable-type secondary battery according to claim 1, wherein the first metal tab and the second metal tab are each independently made of stainless steel, aluminum, nickel, titanium, sintered carbon, or copper; stainless steel treated with carbon, nickel, titanium or silver on a surface thereof; or an aluminum-cadmium alloy.

4. The cable-type secondary battery according to claim 2, wherein the first electrolyte-leakage preventing layer and the second electrolyte-leakage preventing layer each independently comprise a thermal adhesive film or a heat shrinkable tube.

5. The cable-type secondary battery according to claim 4, wherein the thermal adhesive film comprises any one selected from polyethylene, polypropylene, polyethylene terephthalate, polyamide, polyimide and a mixture thereof.

6. The cable-type secondary battery according to claim 1, wherein in the outer electrode,
    the outer electrode active material layer is formed to surround the outer surface of the separation layer, and the outer current collector is formed to surround an outer surface of the outer electrode active material layer;
    the outer current collector is formed to surround the outer surface of the separation layer, and the outer electrode active material layer is formed to surround an outer surface of the outer current collector;
    the outer current collector is formed to surround the outer surface of the separation layer, and the outer electrode active material layer is formed to surround the outer surface of the outer current collector and to come into contact with the separation layer; or
    the outer electrode active material layer is formed to surround the outer surface of the separation layer, and the outer current collector is formed to be included inside the outer electrode active material layer by being covered therein and to surround the outer surface of the separation layer with spacing apart therefrom.

7. The cable-type secondary battery according to claim 1, wherein the outer current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; or a conductive polymer.

8. The cable-type secondary battery according to claim 7, wherein the conductive material is selected from the group consisting of polyacetylene, polyaniline, polypyrrole, polythiophene, polysulfurnitride, indium tin oxide (ITO), silver, palladium, nickel, and a mixture thereof.

9. The cable-type secondary battery according to claim 7, wherein the conductive polymer is selected from the group consisting of polyacetylene, polyaniline, polypyrrole, polythiophene, polysulfurnitride, and a mixture thereof.

10. The cable-type secondary battery according to claim 1, wherein the inner current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; or a conductive polymer.

11. The cable-type secondary battery according to claim 10, wherein the conductive material is selected from the group consisting of polyacetylene, polyaniline, polypyrrole, polythiophene, polysulfurnitride, indium tin oxide (ITO), silver, palladium, nickel, and a mixture thereof.

12. The cable-type secondary battery according to claim 10, wherein the conductive polymer is selected from the group consisting of polyacetylene, polyaniline, polypyrrole, polythiophene, polysulfurnitride, and a mixture thereof.

13. The cable-type secondary battery according to claim 1, wherein the inner electrode is an anode and the outer electrode is a cathode, or the inner electrode is a cathode and the outer electrode is an anode.

14. The cable-type secondary battery according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and a mixture thereof, and
the outer electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

15. The cable-type secondary battery according to claim 1, wherein when the inner electrode is a cathode and the outer electrode is an anode,
the inner electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and a mixture thereof.

16. The cable-type secondary battery according to claim 1, wherein the separation layer is an electrolyte layer or a separator.

17. The cable-type secondary battery according to claim 16, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

18. The cable-type secondary battery according to claim 16, wherein the electrolyte layer further comprises a lithium salt.

19. The cable-type secondary battery according to claim 18, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

20. The cable-type secondary battery according to claim 16, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

21. The cable-type secondary battery according to claim 1, wherein the cable-type secondary battery extends longitudinally from a first end toward a second end, and wherein the first metal tab is adjacent the first end of the cable-type secondary battery and the second metal tab is adjacent the second end of the cable-type secondary battery.

22. The cable-type secondary battery according to claim 1, wherein in the outer electrode, the outer current collector is formed to surround the outer surface of the separation layer, and the outer electrode active material layer is formed to surround the outer surface of the outer current collector and to come into contact with the separation layer.

23. The cable-type secondary battery according to claim 1, wherein the first and second metal tabs are each comprised of a metal material having a mechanical strength that is superior to that of a material that comprises the inner current collector and to that of a material that comprises the outer current collector.

24. A cable-type secondary battery extending longitudinally, comprising:
an inner electrode comprising a wire-type inner current collector having a first metal tab extending at one end of the inner current collector, and an inner electrode active material layer formed on a surface of the inner current collector;
a separation layer formed on an outer surface of the inner electrode active material layer; and an outer electrode formed on an outer surface of the separation layer, and comprising an outer electrode active material layer and an outer current collector having a second metal tab extending at one end of the outer current collector, wherein the outer current collector is a helically wound wire-type current collector or a wound sheet-type current collector, and wherein in the outer electrode, the outer current collector is formed to surround the outer surface of the separation layer, and the outer electrode active material layer is formed to surround the outer surface of the outer current collector and to come into contact with the separation layer.

* * * * *